(12) United States Patent
Spalka et al.

(10) Patent No.: US 8,699,705 B2
(45) Date of Patent: Apr. 15, 2014

(54) COMPUTER IMPLEMENTED METHOD FOR GENERATING A SET OF IDENTIFIERS FROM A PRIVATE KEY, COMPUTER IMPLEMENTED METHOD AND COMPUTING DEVICE

(75) Inventors: Adrian Spalka, Koblenz (DE); Jan Lenhardt, Koblenz (DE)

(73) Assignee: Compugroup Medical AG, Koblenz (DE)

( * ) Notice: Subject to any disclaimer, the term of this patent is extended or adjusted under 35 U.S.C. 154(b) by 310 days.

(21) Appl. No.: 12/904,407

(22) Filed: Nov. 3, 2010

(65) Prior Publication Data

US 2011/0150212 A1 Jun. 23, 2011

(30) Foreign Application Priority Data

| Dec. 18, 2009 | (EP) | ................................. | 09179974 |
| Mar. 11, 2010 | (EP) | ................................. | 10156171 |
| Jun. 29, 2010 | (EP) | ................................. | 10167641 |
| Aug. 18, 2010 | (EP) | ................................. | 10173198 |

(51) Int. Cl.
*H04L 9/00* (2006.01)

(52) U.S. Cl.
USPC ............................................................ 380/44

(58) Field of Classification Search
None
See application file for complete search history.

(56) References Cited

U.S. PATENT DOCUMENTS

| 4,864,616 A | 9/1989 | Pond et al. |
| 4,879,747 A | 11/1989 | Leighton et al. |
| 5,210,795 A | 5/1993 | Lipner et al. |
| 5,721,781 A | 2/1998 | Deo et al. |
| 5,754,675 A | 5/1998 | Valadier |
| 5,832,091 A | 11/1998 | Tomko et al. |
| 6,031,910 A | 2/2000 | Deindl et al. |
| 6,167,521 A | 12/2000 | Smith et al. |
| 6,212,519 B1 | 4/2001 | Segal |
| 6,230,269 B1 | 5/2001 | Spies et al. |
| 6,299,062 B1 | 10/2001 | Hwang |
| 6,523,116 B1 | 2/2003 | Berman |
| 6,529,886 B1 | 3/2003 | Campana et al. |
| 6,532,472 B1 | 3/2003 | Arrouye et al. |
| 6,687,375 B1 | 2/2004 | Matyas et al. |
| 6,754,655 B1 | 6/2004 | Segal |
| 6,904,150 B1 | 6/2005 | Dent |
| 6,950,523 B1 | 9/2005 | Brickell et al. |
| 6,959,381 B2 | 10/2005 | Wheeler et al. |

(Continued)

FOREIGN PATENT DOCUMENTS

| DE | 10134489 | 2/2003 |
| DE | 10258769 | 6/2004 |

(Continued)

OTHER PUBLICATIONS

A.J. Menezes "Chapter 8: Public Key Encryption ED" Handbook of Applied Cryptography; CRC Press Series on Discrete Mathematices and Its Applications, CR Press, Boca Raton, Fl, US, 1996.

(Continued)

*Primary Examiner* — Brandon Hoffman

(57) ABSTRACT

The invention relates to a computer implemented method for generating a set of identifiers from a private key, the method comprising the steps of: calculating a set of public keys, wherein the private key and each public key of the set of public keys form an asymmetric cryptographic key pair; and outputting the identifiers comprising the public keys.

11 Claims, 9 Drawing Sheets

(56) References Cited

U.S. PATENT DOCUMENTS

Figure 1:
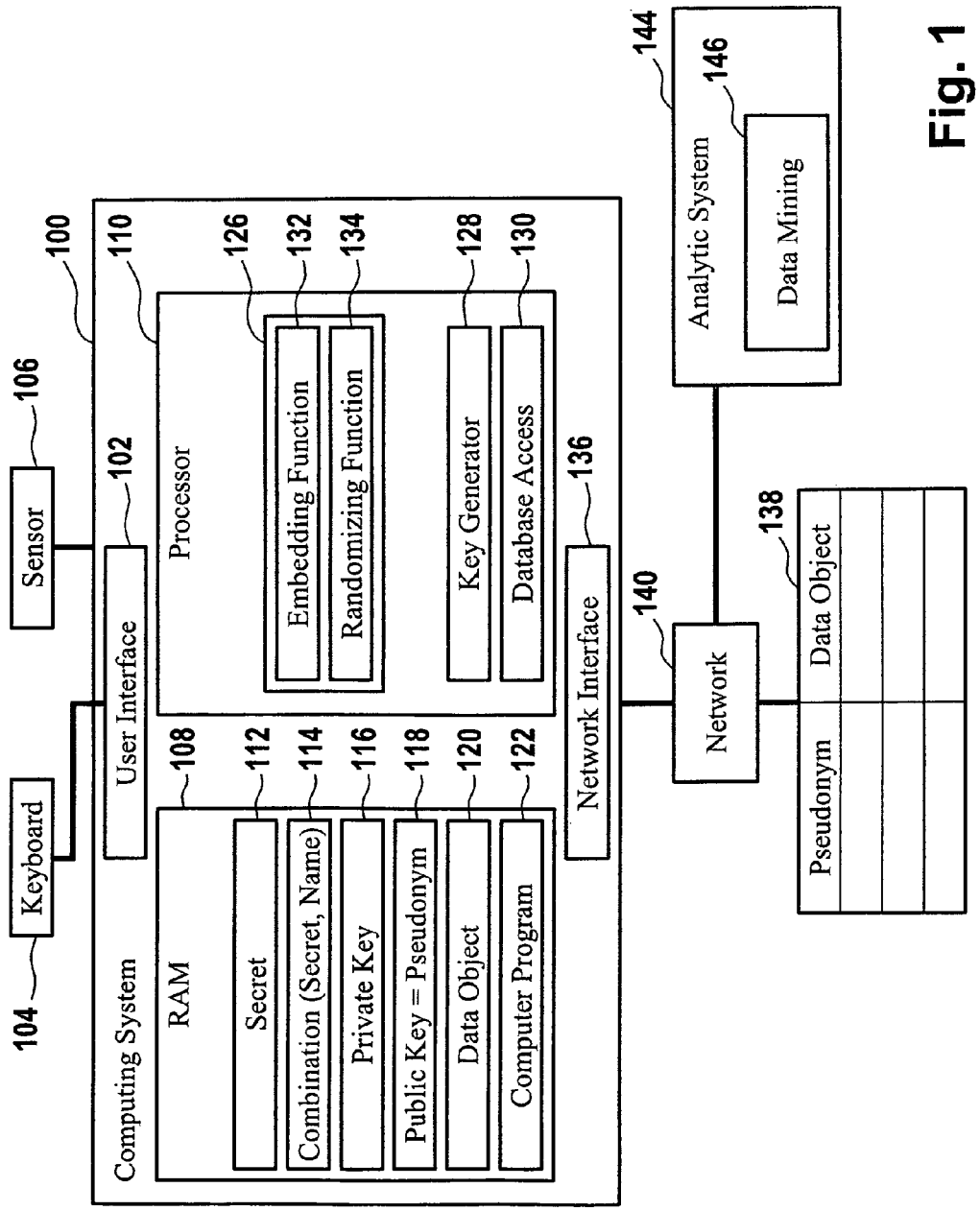

| | | | |
|---|---|---|---|
| 6,963,859 B2 | 11/2005 | Stefik et al. |
| 6,988,088 B1 | 1/2006 | Miikkulainen et al. |
| 7,181,017 B1 | 2/2007 | Nagel et al. |
| 7,254,709 B1 | 8/2007 | Richard |
| 7,266,699 B2 | 9/2007 | Newman et al. |
| 7,393,532 B1 | 7/2008 | de Sauvage et al. |
| 7,502,469 B2 | 3/2009 | Antoine |
| 7,548,621 B1 | 6/2009 | Smith et al. |
| 7,590,236 B1 | 9/2009 | Boneh |
| 7,634,091 B2 | 12/2009 | Zhou et al. |
| 7,634,817 B2 | 12/2009 | Anderson |
| 7,643,817 B2 | 1/2010 | Klug et al. |
| 7,742,932 B2 | 6/2010 | Segal |
| 7,752,443 B2 | 7/2010 | Genty et al. |
| 7,844,717 B2 | 11/2010 | Herz et al. |
| 7,894,448 B1 | 2/2011 | Lillibridge et al. |
| 7,895,666 B1 | 2/2011 | Eshghi et al. |
| 7,952,443 B2 | 5/2011 | Chang et al. |
| 7,958,362 B2 | 6/2011 | Hwang |
| 7,962,761 B1 | 6/2011 | Spalka |
| 8,024,581 B2 | 9/2011 | Spalka |
| 8,137,922 B2 | 3/2012 | Dieplinger et al. |
| 8,145,718 B1 | 3/2012 | Kacker et al. |
| 8,224,979 B2 | 7/2012 | Herz et al. |
| 8,266,435 B2 | 9/2012 | Spalka |
| 8,516,267 B2 | 8/2013 | Spalka |
| 8,522,011 B2 | 8/2013 | Spalka |
| 2001/0039503 A1 | 11/2001 | Chan et al. |
| 2002/0004899 A1 | 1/2002 | Azuma |
| 2002/0010679 A1 | 1/2002 | Felsher |
| 2002/0021810 A1 | 2/2002 | Solinas |
| 2002/0025045 A1 | 2/2002 | Raike |
| 2002/0091687 A1 | 7/2002 | Eglington |
| 2002/0103765 A1 | 8/2002 | Ohmori |
| 2002/0133707 A1 | 9/2002 | Newcombe |
| 2002/0184224 A1 | 12/2002 | Haff et al. |
| 2003/0046560 A1 | 3/2003 | Inomata et al. |
| 2003/0065776 A1 | 4/2003 | Malik et al. |
| 2003/0115457 A1 | 6/2003 | Wildish et al. |
| 2003/0118200 A1 | 6/2003 | Beaucoup et al. |
| 2003/0149854 A1* | 8/2003 | Yoshino et al. ............... 711/173 |
| 2003/0160815 A1 | 8/2003 | Muschetto |
| 2003/0190046 A1 | 10/2003 | Kamerman et al. |
| 2004/0025036 A1 | 2/2004 | Balard et al. |
| 2004/0059925 A1 | 3/2004 | Benhammou et al. |
| 2004/0083182 A1 | 4/2004 | Moribatake et al. |
| 2004/0109567 A1 | 6/2004 | Yang et al. |
| 2004/0181679 A1 | 9/2004 | Dettinger |
| 2004/0199764 A1 | 10/2004 | Koechling et al. |
| 2005/0091341 A1 | 4/2005 | Knight et al. |
| 2005/0138353 A1 | 6/2005 | Spies |
| 2005/0157880 A1 | 7/2005 | Kurn et al. |
| 2005/0163320 A1 | 7/2005 | Brown et al. |
| 2005/0163549 A1 | 7/2005 | Shima et al. |
| 2005/0238175 A1 | 10/2005 | Plotkin et al. |
| 2005/0273604 A1 | 12/2005 | Lai |
| 2005/0283608 A1 | 12/2005 | Halcrow et al. |
| 2006/0031301 A1 | 2/2006 | Herz et al. |
| 2006/0034456 A1 | 2/2006 | McGough |
| 2006/0095771 A1 | 5/2006 | Appenzeller et al. |
| 2006/0106805 A1 | 5/2006 | Aaron |
| 2006/0153364 A1 | 7/2006 | Beeson |
| 2006/0153368 A1 | 7/2006 | Beeson |
| 2006/0153370 A1 | 7/2006 | Beeson |
| 2006/0277413 A1 | 12/2006 | Drews |
| 2007/0028108 A1 | 2/2007 | Cowburn et al. |
| 2007/0089168 A1 | 4/2007 | Wang et al. |
| 2007/0112782 A1 | 5/2007 | Lobach et al. |
| 2007/0118891 A1 | 5/2007 | Buer |
| 2007/0165864 A1 | 7/2007 | Nagase et al. |
| 2007/0198848 A1 | 8/2007 | Bjorn |
| 2007/0206789 A1 | 9/2007 | Sotoodeh |
| 2007/0208800 A1 | 9/2007 | Frohlich et al. |
| 2007/0273518 A1 | 11/2007 | Lupoli et al. |
| 2007/0294533 A1 | 12/2007 | Toh et al. |
| 2008/0005086 A1 | 1/2008 | Moore |
| 2008/0022361 A1 | 1/2008 | Bharadwak |
| 2008/0040603 A1 | 2/2008 | Stedron |
| 2008/0126794 A1 | 5/2008 | Wang et al. |
| 2008/0148047 A1 | 6/2008 | Appenseller et al. |
| 2008/0152146 A1 | 6/2008 | Conrado et al. |
| 2008/0154782 A1 | 6/2008 | Kang et al. |
| 2008/0183656 A1 | 7/2008 | Perng |
| 2008/0247540 A1 | 10/2008 | Ahn et al. |
| 2008/0250253 A1 | 10/2008 | Beckwith et al. |
| 2008/0263050 A1 | 10/2008 | Randazzo et al. |
| 2008/0267394 A1 | 10/2008 | Nan et al. |
| 2008/0270579 A1 | 10/2008 | Herz et al. |
| 2008/0301459 A1 | 12/2008 | Ebeid |
| 2009/0006860 A1 | 1/2009 | Ross |
| 2009/0041249 A1 | 2/2009 | Tanaka et al. |
| 2009/0129600 A1 | 5/2009 | Brickell et al. |
| 2009/0138727 A1 | 5/2009 | Campello de Souza |
| 2009/0158035 A1 | 6/2009 | Stultz |
| 2009/0187419 A1 | 7/2009 | Renganathan et al. |
| 2009/0187757 A1 | 7/2009 | Kerschbaum |
| 2009/0193250 A1 | 7/2009 | Yokota et al. |
| 2009/0205026 A1 | 8/2009 | Haff et al. |
| 2009/0210724 A1 | 8/2009 | Hori |
| 2009/0240941 A1 | 9/2009 | Lee et al. |
| 2009/0245515 A1 | 10/2009 | Bond et al. |
| 2009/0287837 A1 | 11/2009 | Felsher |
| 2009/0293116 A1 | 11/2009 | DeMello et al. |
| 2010/0011410 A1 | 1/2010 | Liu |
| 2010/0017593 A1 | 1/2010 | Putz |
| 2010/0031025 A1 | 2/2010 | Zhang et al. |
| 2010/0088320 A1 | 4/2010 | Fortier et al. |
| 2010/0098256 A1 | 4/2010 | Kirshenbaum |
| 2010/0131296 A1 | 5/2010 | Knutson |
| 2010/0138655 A1 | 6/2010 | Matsui et al. |
| 2010/0191975 A1 | 7/2010 | Chase et al. |
| 2010/0208895 A1 | 8/2010 | Boneh et al. |
| 2010/0250937 A1 | 9/2010 | Blomquist et al. |
| 2010/0280333 A1 | 11/2010 | Parshuram et al. |
| 2011/0072142 A1 | 3/2011 | Herz et al. |
| 2011/0123027 A1 | 5/2011 | Gotthardt |
| 2011/0150212 A1 | 6/2011 | Spalka |
| 2011/0154025 A1 | 6/2011 | Spalka |
| 2011/0154044 A1 | 6/2011 | Spalka |
| 2011/0154054 A1 | 6/2011 | Spalka |
| 2011/0154055 A1 | 6/2011 | Spalka |
| 2011/0154056 A1 | 6/2011 | Spalka |
| 2011/0173455 A1 | 7/2011 | Spalka |
| 2011/0179286 A1 | 7/2011 | Spalka |
| 2011/0185177 A1 | 7/2011 | Spalka |
| 2011/0185178 A1 | 7/2011 | Gotthardt |
| 2011/0185188 A1 | 7/2011 | Spalka |
| 2011/0191590 A1 | 8/2011 | Darbellay et al. |
| 2011/0225114 A1 | 9/2011 | Gotthardt |
| 2011/0268269 A1 | 11/2011 | Spalka |
| 2011/0307961 A1 | 12/2011 | de Perthuis |
| 2012/0063592 A1 | 3/2012 | Spalka |
| 2012/0063594 A1 | 3/2012 | Spalka |
| 2012/0087494 A1 | 4/2012 | Spalka |
| 2013/0179176 A1 | 7/2013 | Gotthardt |

FOREIGN PATENT DOCUMENTS

| | | |
|---|---|---|
| DE | 102004044892 | 3/2006 |
| DE | 102004051296 | 5/2006 |
| DE | 102004063962 | 6/2006 |
| DE | 102006057201 A1 | 6/2008 |
| DE | 102004051296 | 5/2009 |
| EP | 334616 | 9/1989 |
| EP | 0334616 | 9/1989 |
| EP | 1105998 | 6/2001 |
| EP | 1411514 | 4/2004 |
| EP | 1657547 | 5/2006 |
| EP | 1657847 | 5/2006 |
| EP | 1657847A1 Y | 5/2006 |
| EP | 1890270 | 2/2008 |
| EP | 2474954 | 3/2008 |
| EP | 2263215 | 8/2012 |
| WO | WO9914652 | 3/1999 |

(56) References Cited

FOREIGN PATENT DOCUMENTS

| WO | WO9933222 | 7/1999 |
|---|---|---|
| WO | 00/41613 A2 | 7/2000 |
| WO | WO0054125 | 9/2000 |
| WO | WO0072504 | 11/2000 |
| WO | 01/69513 A2 | 9/2001 |
| WO | WO0205061 | 1/2002 |
| WO | 02/09580 A1 | 2/2002 |
| WO | WO2007031955 | 3/2007 |
| WO | WO2007091002 | 8/2007 |
| WO | WO2008059475 | 5/2008 |
| WO | WO 2008-085881 | 7/2008 |
| WO | WO2008085881 | 7/2008 |
| WO | WO 2008085881 A | 7/2008 |

OTHER PUBLICATIONS

A.J. Menezes "Chapter 12 Key Establishment Protocols ED" Handbook of Applied Cryptography; CRC Press Series on Discrete Mathematices and Its Applications, CR Press, Boca Raton, Fl, US, 1996.

A.J. Menezes "Chapter 13 Key Management Techniques ED" Handbook of Applied Cryptography; CRC Press Series on Discrete Mathematices and Its Applications, CR Press, Boca Raton, Fl, US, 1996.

Arokiaraj, A. Rex Macedo et al., "ACS: An Efficient Address Based Cryptography Scheme for Mobile Ad Hoc Networks Security", IEEE International Conference on Computer and Communication Engineering, 2008, Piscataway, NJ, USA, May 13, 2008, pp. 52-56, XP031292749, ISBN: 978-1-4244-1691-2.

Benjumea et al., "Anonymous Attribute Certificates Based on Traceable Signatures," Internet Research, vol. 16, No. 2, Jan. 2006, pp. 120-139.

Chao, Gao, "Study on Privacy Protection and Anonymous Communication in Peer-to-Peer Networks", IEEE 2009 International Conference on Multimedia Information Networking and Security, Piscataway, NJ, USA, Nov. 18, 2009, pp. 522-525, XP031592182, ISBN: 978-0-7695-3843-3.

Chothia, Tom et al., "Securing Pseudo Identities in an Anonymous Peer-to-Peer File-Sharing Network," IEEE Third International Conference on Security and Privacy in Communications Networks and the Workshops, 2007, Piscataway, NJ, USA, Sep. 17, 2007, pp. 279-282, XP031276557, ISBN: 978-1-4244-0974-7.

Hengartner, U. et al., "Exploiting Hierarchical Identity-Based Encryption for Access Control to Pervasive Computing Information," IEEE Proceedings of the First International Conference on Security and Privacy for Emerging Areas in Communications Networks, ISBN 0-7695-2369-2/05, 2005, 10 pages.

Hoffstein, et al., "An Introduction to Mathematical Cryptography," 2008 Spring Scient Busniess Media, LLC; ISBN 978-0-387-77993-5, pp. 60-61 (4 total pages).

Montenegro, G. et al., "Statistically Unique and Cryptographically Verifiable Identifiers and Addresses", 5. JCT-VC Meeting; 96. MPEG Meeting; Mar. 16, 2011-Mar. 23, 2011; Geneva;(Joint Collaborative Team on Video Coding of ISO/IEC JTC1/SC29/WG11 AND ITU-T SG.16); URL: http://wftp3.itu.int/av-arch/jc tvc-site/-17/03/2011, Internet Engineering Task Force, IETF, Apr. 1, 2001, XP015032660, ISSN: 0000-0004, 13 pages.

Musen, M.A. et al., "Clinical Decision-Support Systems," from "Biomedical Informatics: Computer Applications in Health Care and Biomedicine," May 25, 2006, New York, NY, pp. 698-736.

Shamir, A: "Identity-Based Cryptosystems and Signature Schemes," Lecture Notes in Computer Science/MICCAI 2000, Springer, DE; Jan. 1, 1985, pp. 47-53, XP000675444, DOI: 10.1007/3-540-39568-7_5 ISBN: 978-3-540-24128-7.

Rare Diseases Act, Nov. 6, 2002, Public Law 107-280, 107th Congress, 5 pages.

Menezes A J; Van Oorschot P. C; Vanstone S A, A practical and dynamic key management scheme for a user hierachy, Handbook of Applied Cryptography; CRC Press Series on Discrete Mathematices and Its Applications, 35339, 489-541, 2006.

Menezes A J; Van Oorschot P. C; Vanstone S A, A practical and dynamic key management scheme for a user hierachy, Handbook of Applied Cryptography; CRC Press Series on Discrete Mathematices and Its Applications, 35339, 543-590, 2006.

Menezes A J; Van Oorschot P C; Vanstone S A, A practical and dynamic key management scheme for a user hierachy, Handbook of Applied Cryptography; CRC Press Series on Discrete Mathematices and Its Applications, 35339, 283-319, 2006.

Fuh-Gwo Jeng et al, A Practical and Dynamic Key Management Scheme for a User Hiearchy, Journal of Zhejiang University Science A; , 38777, 296-301, 7, an International Applied Physics and Enginering Journal, Berlin, Germany, 2006.

Yang Zhang, An Efficient Anonymous Authentication Protocol With Pseudonym Revocability, Inc, IMS and IDC, 2009 Fifth Internation Joint Conference on, 40050, 1929-1934, XP031564722, 2009.

Elliptic Curve Cryptography, www.bsi.bund.de/shareddocs/downlods/de/bsi/publikationen/technischerichtlinien/TR03111/BSI-TR-03111_odf.pdf?_blob=publicationfile, 39920, 2009.

Yu Fang Chung, Access Control in User Hierarchy Based on Elliptical Curve Cryptosystem, 39090, Science Direct, 2007.

Mikhail J. Atallah, Dynamic and Efficient Key Management for Access Hierarchies, Department of Computer Science Purdue University, 38663, 190-201, 2005.

Ravinderpal S. Sandhu, On Some Cryptographical Solutoins for Access Control in a Tree Hierarchy, Department of Computer and Information Science, 405-410, The Ohio State University, Columbus, USA, 1987.

Ehud Gudes, The Design of a Cryptography Based Secure File System, EEE Transactoins on Software Engineering, 29465, 5, 1980.

F. H. Ku, Cryptographic Key Assignment Scheme for Dynamic Access Control in a User Hierarchy, 36404, 146, IEE Proc. Computers and Digital Techniques, 1999.

Yang Zhang: "An Efficient Anonymous Authentication Protocol with Pseudonym Revocability", Inc, IMS and IDC, 2009 Fifth International Joint Conference on, IEEE, Piscataway, NJ, USA, Aug. 25, 2009, pp. 1929-1934, XP031564722, ISBN: 978-07695-3769-6.

Lin, Y.; Maozhi, X.; Zhiming, Z.: 'Digital signature systems based on Smartcard and fingerprint feature' Journal of Systems Engineering and Electronics Bd. 18, Nr. 4, 2007, pp. 825-834.

Elliptic Curve Cryptography, Technical Guideline TR-03111, Apr. 17, 2009, Bundesamt fur Sicherheit in der Informationstechnik, Bonn, Germany.

Guinee, Richard and Blaszczyk, Marta, "A Novel True Random Binary Sequence Generator Based on a Chaotic Double Scroll Oscillator Combination with a Pseudo Random Generator for Cryptographic Applications", 2009, IEEE Internet Technology and Secured Transactions.

Nadehara, Kouhei et al. "Extended Instructions for the AES Cryptography and their Efficient Implementation", 2004, IEEE Conference on Signal Processing Systems, p. 152-157.

Waters B Ret. Al, "Receiver anonymity via incomparable public keys" Proceedings of the 10th ACM Conference on Computer and Comunitcations Security, Washington D.C. vol. Conf 10, Oct. 27, 2003, XP002361168, 001:10.1145/948109.948127, ISBN 978-1-58113-738-5.

Aj. Menezes "Chapter 8: Public Key Encryption Ed" Handbook of Applied Cryptography; CRC Press Series on Discrete Mathematices and Its Applications, CR Press, Boca Raton, Fl, US, 2006.

Aj. Menezes "Chapter 12 Key Establishment Protocols Ed" Handbook of Applied Cryptography; CRC Press Series on Discrete Mathematices and Its Applications, CR Press, Boca Raton, Fl, US, 2006.

Aj. Menezes "Chapter 13 Key Management Techniques Ed" Handbook of Applied Cryptography; CRC Press Series on Discrete Mathematices and ITS Applications, CR Press, Boca Raton, Fl, US, 2006.

Rankl/Effing: "Handbuch Der Chipkarten" 1999, Hanser, Germany, XP002530086, pp. 51,187-203, 222-244,397-433,441-442,457-465.

Rankl/Effing: "Smart Card Handbook, Third Edition" 1999, John Wiley & Sons, Ltd., ISBN: 0-470-85668-8, pp. 51,187-203, 222-244,397-433,441-442,457-465.

(56) References Cited

OTHER PUBLICATIONS

Camenisch; Hohenberger; Kohlweiss: "How to Win the Clone Wars: Efficient Periodic n-Times Anonymous Authentication", 2006.
Schneider et al., "Implementing Trustworthy Services Using Replicated State Machines", 2005.
Bresson et al., "Dynamic Group Diffie-Hellman Key Exchange under Standard Assumptions", 2002.
Sandhu R S. On some cryptographic solutions for access control in a tree hierarchy. Proceedings 1987 Fall Joint Computer Conference—Exploring Technology: Today and Tomorrow.
Ehud Gudes, The Design of Cryptography Based Secure File System, IEEE Transactions on Software Engineering, Sep. 1980.
Kuo Fh et al, Cryptographic Key Assignment Scheme for Dynamic Access Control in a User Hierarchy, IEE Proceedings: Computers and Digital Techniques, Sep. 22, 1980.
Atallah M J et Al, Dynamic and Efficient Key Management for Access Hierarchies, Proceedings of the 12th ACM Conference on Computer and Communications Security, Nov. 7-11, 2005, Alexandria, VA.
Chung et al, Access Control in User Hierarchy Based Elliptic Curve Cryptosystem, Information Sciences, Oct. 2007, Amsterdam, NL.

* cited by examiner

COMPUTER IMPLEMENTED METHOD FOR GENERATING A SET OF IDENTIFIERS FROM A PRIVATE KEY, COMPUTER IMPLEMENTED METHOD AND COMPUTING DEVICE

CLAIM FOR PRIORITY

This application claims the benefit of European Patent Applications No. 10 173 198.2, filed Aug. 18, 2010; No. 10 167 641.9, filed Jun. 29, 2010; No. 10 156 171.0, filed Mar. 11, 2010; and No. 09 179 974.2, Dec. 18, 2009, which are hereby incorporated herein.

FIELD OF THE INVENTION

The present invention relates to the field of computer implemented identifier generators.

BACKGROUND OF THE INVENTION

Various computer implemented schemes for providing an identifier for a database exist. The identifier could for instance be a pseudonym. A pseudonym is typically used for protecting the informational privacy of a user such as in a social network. Such computer implemented schemes for providing a pseudonym typically enable the disclosure of identities of anonymous users if an authority requests it, if certain conditions are fulfilled. For example, Benjumea et al, Internet Research, Volume 16, No. 2, 2006 pages 120-139 devise a cryptographic protocol for anonymously accessing services offered on the web whereby such anonymous accesses can be disclosed or traced under certain conditions.

Even in case absolute anonymity is guaranteed using a certain pseudonym with increasing amount of data the risk increases that by means of data correlation techniques of the data stored with respect to said pseudonym, conclusions can be drawn from said data about the owner of the pseudonym. Further, a large number of different features stored with respect to a person increases the probability that the person's identity can be revealed, for example by means of the combination of the person's ZIP code, age, profession, marital status and height. Thus, with an increasing amount of data stored with respect to a pseudonym, the risk of breaking the user's anonymity is also increasing.

BRIEF SUMMARY OF THE INVENTION

The invention provides a computer implemented method, a computer program product and a computing device in the independent claims. Embodiments are given in the dependent claims.

The invention provides a computer implemented method for generating a set of identifiers from a private key, wherein the method comprises calculating a set of public keys, wherein the private key and each public key of the set of public keys form an asymmetric cryptographic key pair. Further the method comprises outputting the identifiers comprising the public keys. Preferably, the public keys are identical with the identifiers.

The term 'identifier' as used herein is data or a character string which is used to provide access to data. In some embodiments the identifier may be a reference used for identifying or locating data in the database. For example, in some embodiments an identifier may be a pseudonym. The pseudonym allows identification of the ownership of various records. In other embodiments an identifier may be a password or user identification. In other embodiments the identifier may identify a record or records within the database. Records may be individual data files or they may be a collection of data files or tuples in a database relation. An identifier may be an access key like a primary key for a relation in a database. An identifier may also be a unique key for a relation in a relational database.

Embodiments of the invention have the advantage that for example access to a database or a computer system or generally a key secured system can be performed using a set of public keys, wherein the set of public keys is associated with one common private key thus forming asymmetric cryptographic key pairs. Thus, a user may be associated with 'multiple identities' using a single credential, namely the private key.

Various scenarios exist where such a set of public keys can be employed. In a first scenario, the public keys may be used as access keys in a database such that the identifiers are database access keys. In this case, the method preferably comprises depositing data into the database using the identifiers. For example, the data may comprise medical datasets of a patient, the patient being the owner of the private key, wherein the medical datasets may be stored in the database sorted by medical topics. In this case, an individual public key of the set of public keys of the patient may be associated with a certain medical topic. Thus, the medical datasets are not stored in the database using one common identifier for all medical topics, but the datasets are stored in a distributed manner in the database using a set of identifiers with a different identifier for each medical topic. Nevertheless, by means of his one private key the patient is able to individually generate the set of public keys for access to the datasets stored in the database.

Consequently, correlation attacks fail since correlations can only be detected for a given common identifier.

The term 'database' as used herein is a collection of logically-related data or files containing data that provide data for at least one use or function. Databases are essentially organized data that may be provided or used by an application. Examples of a database include, but are not limited to: a relational database, a file containing data, a folder containing individual data files, and a collection of computer files containing data.

In a second scenario, the identifiers may be used for accessing a key secured system, like for example an online banking system or a digital key entry door system. In these cases, a large set of the identifiers may be stored with the online banking system or the door entry system, wherein the identifiers are associated with an expiration value. In case of an online banking system, transaction authentication numbers (TANs) are used to authorize individual bank transactions, wherein each TAN can only be used one time. In this case, the identifiers may be used as individual TANs with an expiration value which permits only once to use an identifier for performing an online bank transaction. Consequently, here the user is able to conveniently perform online banking employing TANs using his private key. This principle can also be employed for the above mentioned door entry system, wherein for example a front door may be opened using a given identifier of the set of identifiers only a predetermined amount of times after which the given identifier expires.

In accordance with an embodiment of the invention, the method further comprises the step of depositing data into a database using the identifier. This embodiment is advantageous because the identifier may be used to control access to the database. Alternatively the identifier could be used as a pseudonym for which data deposited into the database is referenced against. This provides anonymity for a user.

In accordance with an embodiment of the invention, the method further comprises the step of generating a digital signature for the data using the private key. The digital signature is deposited into the database, associated with the data. This embodiment is particularly advantageous because the digital signature for the data allows authentication of the data. In this way the authorship of the data can be verified.

In accordance with an embodiment of the invention, the method comprises the step of verifying the authenticity of the data using the identifier. This embodiment is advantageous because the authenticity or authorship of the data can be verified using the identifier.

In accordance with an embodiment of the invention, the identifier is used as a pseudonym by the database. In this embodiment the data which was deposited into the database is referenced as being deposited by a specific person or entity using a pseudonym. An advantage of this embodiment of the method is that data can be stored or referenced in a database using the pseudonym without revealing the identity of who placed the data into the database.

Thus, some embodiments of the present invention are particularly advantageous as an extremely high degree of protection of the informational privacy of users is provided. This is because an assignment of the user's identity to the user's pseudonym does not need to be stored and that no third party is required for establishing a binding between the pseudonym and the user's identity. Some embodiments of the present invention enable to generate a user's pseudonym in response to the user's entry of a user-selected secret whereby the pseudonym is derived from the user-selected secret. As the user-selected secret is known only by the user and not stored on any computer system there is no feasible way that a third party could break the informational privacy of the user, even if the computer system would be confiscated such as by a government authority.

This enables to store sensitive user data, such as medical data, in an unencrypted form in a publicly accessible database. The user's pseudonym can be used as a database access key, e.g. a primary key or candidate key value that uniquely identifies tuples in a database relation, for read and write access to data objects stored in the database.

For example, the database with pseudonymous data can be used for a decision support system, e.g. in the medical field for evaluating a user's individual medical data and processing the data by rules. The result of the evaluation and processing by rules may be hints and recommendations to the physician regarding the user's health condition and further treatment.

In accordance with a further embodiment of the invention, the set of public keys is calculated from the private key using elliptic curve cryptography, wherein said calculation is performed by a variation of the domain parameters used for performing the elliptic curve cryptography. For the case of simplicity, only one parameter of the domain parameters is varied here accordingly. For example, in a first step of calculating a first public key the private key and a first base point and a set of further domain parameters may be used. The first public key is calculated using asymmetric cryptography which is implemented using elliptical curve cryptography. Then, the first base point is replaced by a second base point that is not inferable from the first base point in an easy way in the domain parameters, wherein the other domain parameters are kept unmodified. Finally, a second public key is calculated by elliptic curve cryptography using the private key, the second base point and the set of unmodified further domain parameters.

However, the invention is not limited to a variation of base points for calculating the set of public keys—any of the domain parameters may be varied for this purpose. Nevertheless, a base point variation is preferred since this provides a computationally efficient way to compute multiple identifiers for a given user in a secure way. Furthermore, it is by far more complicated to vary one or more of the other domain parameters because doing this would result in a different elliptic curve that would have to fulfill many conditions in order to be considered valid.

This embodiment is advantageous because a single private key has been used to generate a set of public keys to be used as identifiers. This is particularly advantageous because the public keys cannot be inferred from each other supposed their respective base points cannot be either, yet only a single input value is needed for all of them. In other words, in case of a base point variation knowledge of one of the public keys does not allow an attacker to determine any other public key. The used public keys are therefore not correlatable. However, all of the public keys are determined by a single input value or private key. It has to be noted that preferably the base points are meant to be public. Nevertheless, an embodiment of the invention where the base points are at the user's discretion may also be possible.

In accordance with a further embodiment of the invention, the method further comprises either directly receiving the private key or generating the private key, wherein generating the private key comprises receiving an input value and applying a cryptographic one-way function to the input value for generation of the private key, wherein the cryptographic one-way function is an infective function.

This embodiment has the advantage that a user may either directly use a private key for the generation of the identifiers, or alternatively he may use a certain input value from which the private key may be calculated. The input value may be a user-selected secret.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

In accordance with a further embodiment of the invention, the method further comprises receiving the user-selected secret as the input value, storing the user-selected secret in a memory, computing the private key by applying an embedding or randomizing function onto the secret, storing the private key in the memory, computing the set of public keys using the private key and erasing the secret and the private key from the memory.

The term 'memory' as used herein encompasses any volatile or non-volatile electronic memory component or a plurality of electronic memory components, such as a random access memory. Examples of computer memory include, but are not limited to: RAM memory, registers, and register files of a processor.

The term 'embedding function' or 'embedding component' as used herein encompasses any infective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and the public parameter, e.g. a single number that embeds the user selected secret and the public parameter. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any infective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

Even though, any known method for generation of asymmetric cryptographic keys may be employed in order to carry out the invention, the embodiment employing the user-selected secret for generating the public key and the private keys is particularly advantageous as an extremely high degree of protection of the informational privacy of users is provided. This is because an assignment of the user's identity to the user's public keys does not need to be stored and that no third party is required for establishing a binding between the public keys and the user's identity. In contrast, embodiments of the present invention enable to generate a set of user's public keys in response to the user's entry of a user-selected secret whereby the public keys are derived from the user-selected secret. As the user-selected secret is only known by the user and not stored on any computer system there is no way that a third party could break the informational privacy of the user, even if the computer system would be confiscated such as by a government authority.

This enables to store sensitive user data, such as medical data, even in an unencrypted form in a publicly accessible database. A user's public key can be used as the database access key, e.g. a primary key or candidate key value that uniquely identifies tuples in a database relation, for access to data objects stored in the database.

The usage of an embedding and/or randomizing function is advantageous because the input value may be clear text or an easily guessed value. By using an embedding and/or randomizing function a pseudonym which is more difficult to decrypt may be constructed.

In accordance with an embodiment of the invention, at least one public parameter is used for applying the embedding and randomization function. A public parameter may be the name of the user, an email address of the user or another identifier of the user that is publicly known or accessible. A combination of the user-selected secret and the public parameter is generated by the embedding component of the embedding and randomization function that is applied on the user-selected secret and the public parameter.

The combination can be generated such as by concatenating the user-selected secret and the public parameter or by performing a bitwise XOR operation on the user-selected secret and the public parameter. This is particularly advantageous as two users may by chance select the same secret and still obtain different identifiers as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key embedding can be skipped and randomization of the user-selected secret is accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, it is determined whether the output of the embedding and randomizing function fulfils a given criterion. For example, it is checked whether the output of the embedding and randomization function is within the interval between 2 and n−1, where n is the order of the elliptic curve. If the output of the embedding and randomizing function does not fulfill this criterion another random number is generated and the embedding and randomization function is applied again to provide another output which is again checked against this criterion. This process is performed repeatedly until the embedding and randomizing function provides an output that fulfils the criterion. This output is then regarded as the private key that is used to calculate the public key, by multiplying the private key with the first base point.

In another aspect, the invention relates to a computer program product comprising computer executable instructions to perform any of the method steps described above.

In another aspect, the invention relates to a computer system for generating a set of identifiers from a private key, the system comprising processor means being operable for calculating a set of public keys, wherein the private key and each public key of the set of public keys form an asymmetric cryptographic key pair; and means for outputting the public keys as the identifiers.

The term 'computer system' as used herein encompasses any device comprising a processor. The term 'processor' as used herein encompasses any electronic component which is able to execute a program or machine executable instructions. References to the computing device comprising "a processor" or a "microcontroller" should be interpreted as possibly containing more than one processor. The term 'computer system' should also be interpreted to possibly refer to a collection or network of computing devices each comprising a processor. Many programs have their instructions performed by multiple processors that may be within the same computing device or which may be even distributed across multiple computing device.

In accordance with an embodiment of the invention, the system either comprises means for directly receiving the private key or means for receiving an input value, wherein the processor means are further operable for generating the private key, wherein generating the private key comprises applying a cryptographic one-way function to the input value for generation of the private key, wherein the cryptographic one-way function is an infective function.

In accordance with an embodiment of the invention, the input value is a user-selected secret, the system further comprising a memory for storing the user-selected secret and a private key and a processor operable for executing instructions stored in the memory, wherein the memory contains instructions for performing the steps of:

storing the user-selected secret in a memory;
computing the private key by applying an embedding or randomizing function onto the secret;
storing the private key in the memory;
computing the set of public keys using the private key; and
erasing the secret and the private key from the memory.

BRIEF DESCRIPTIONS OF THE DRAWINGS

Figure 2:
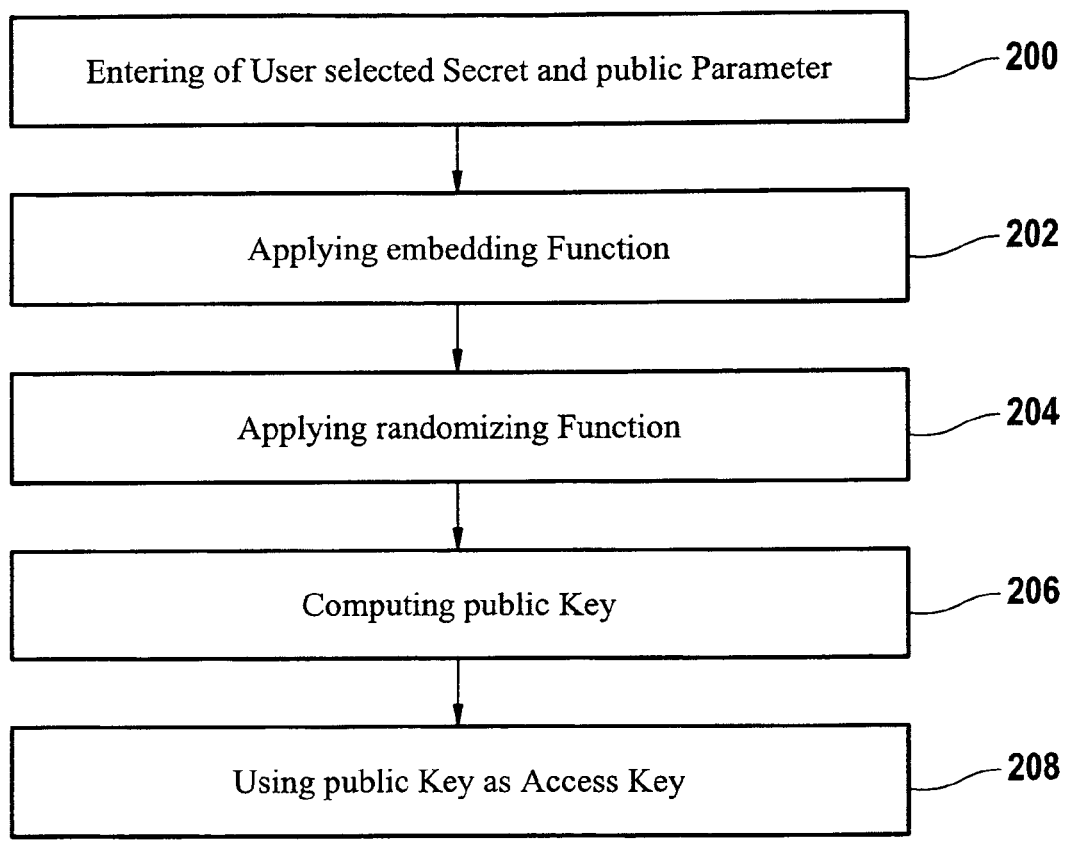
Figure 3:
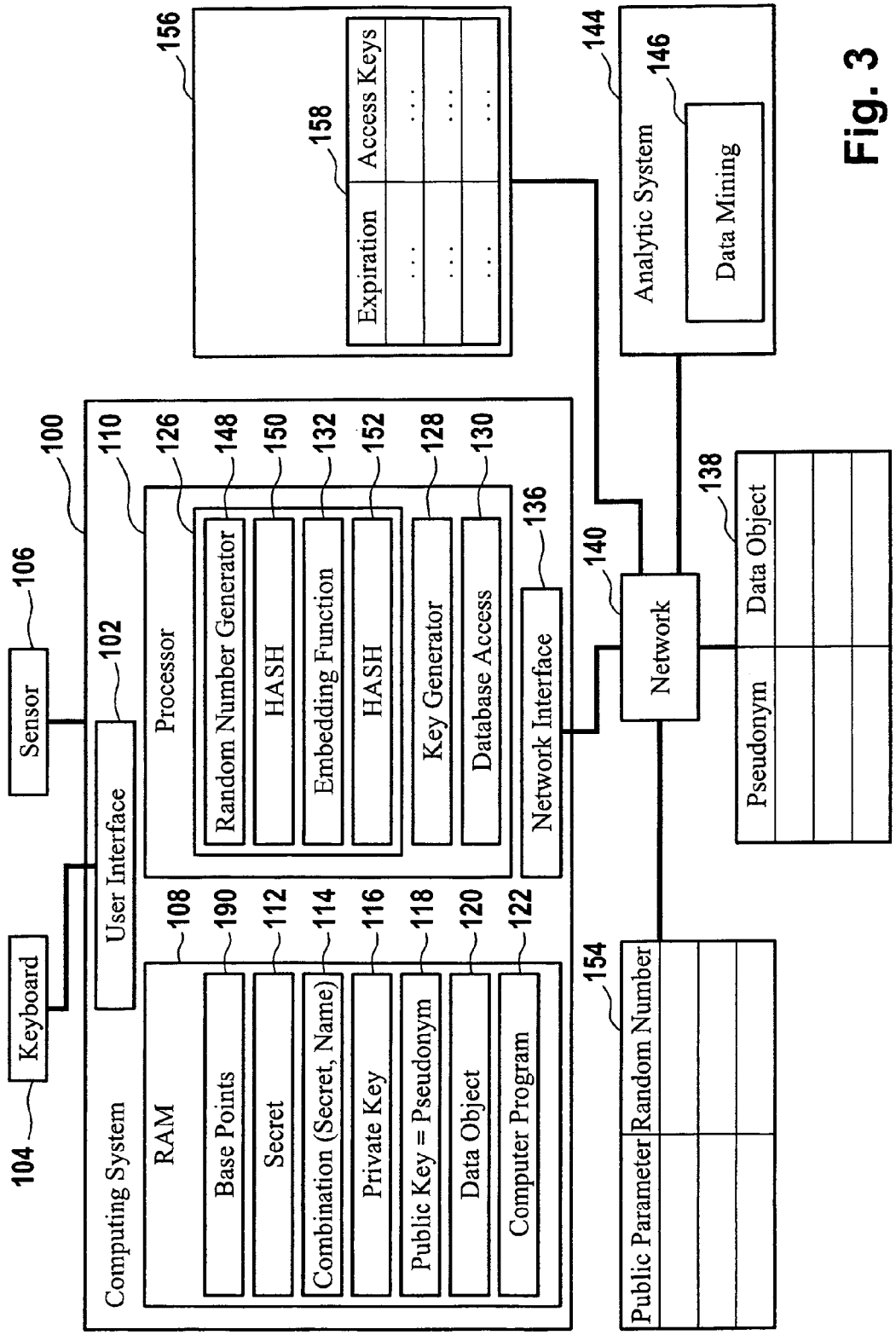
Figure 4:
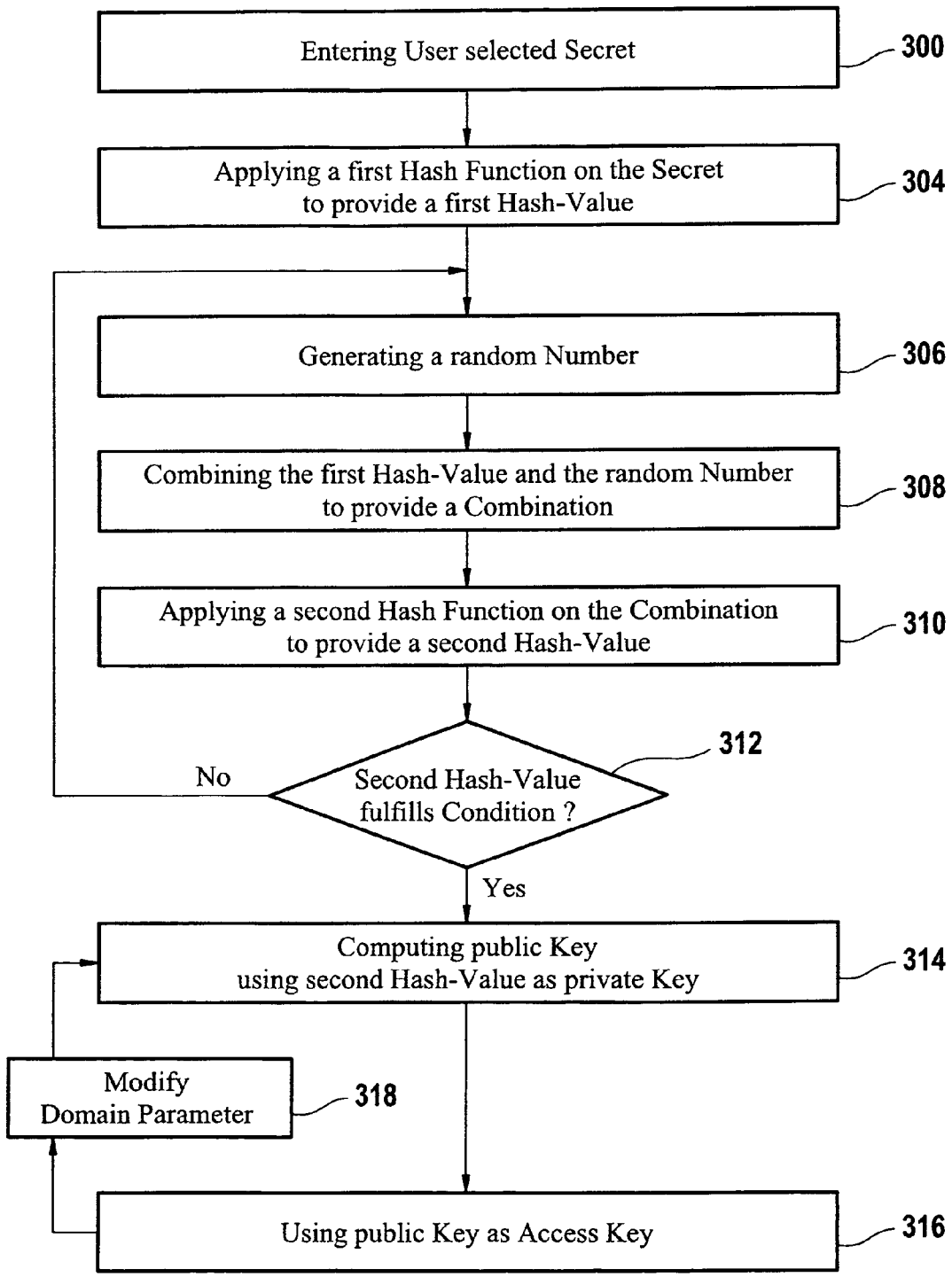
Figure 5:
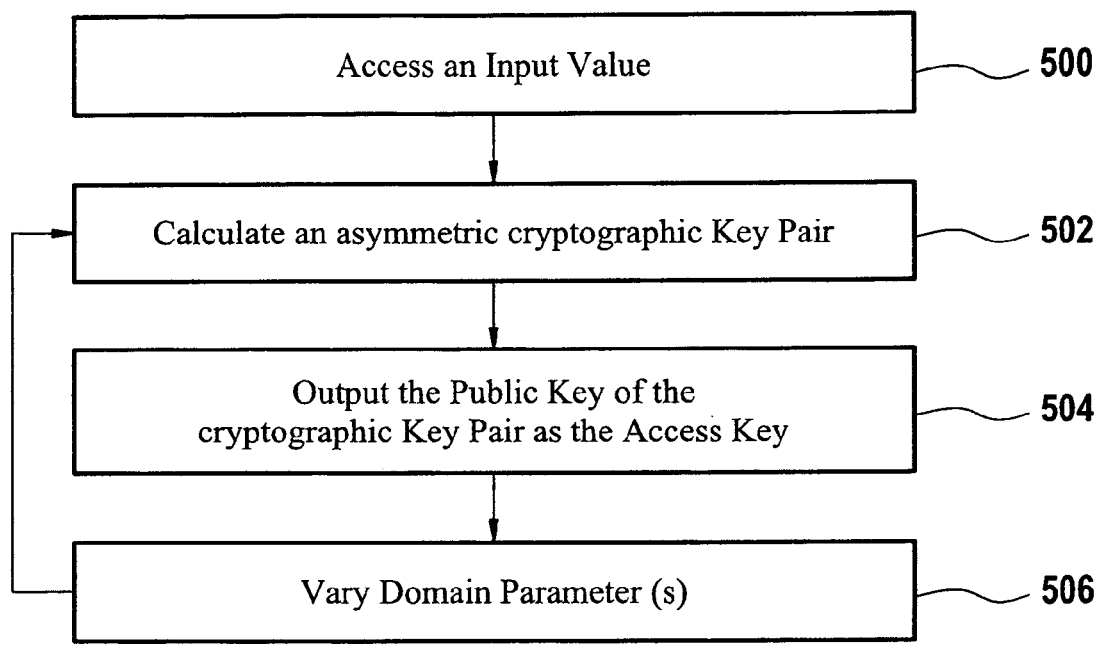
Figure 6:
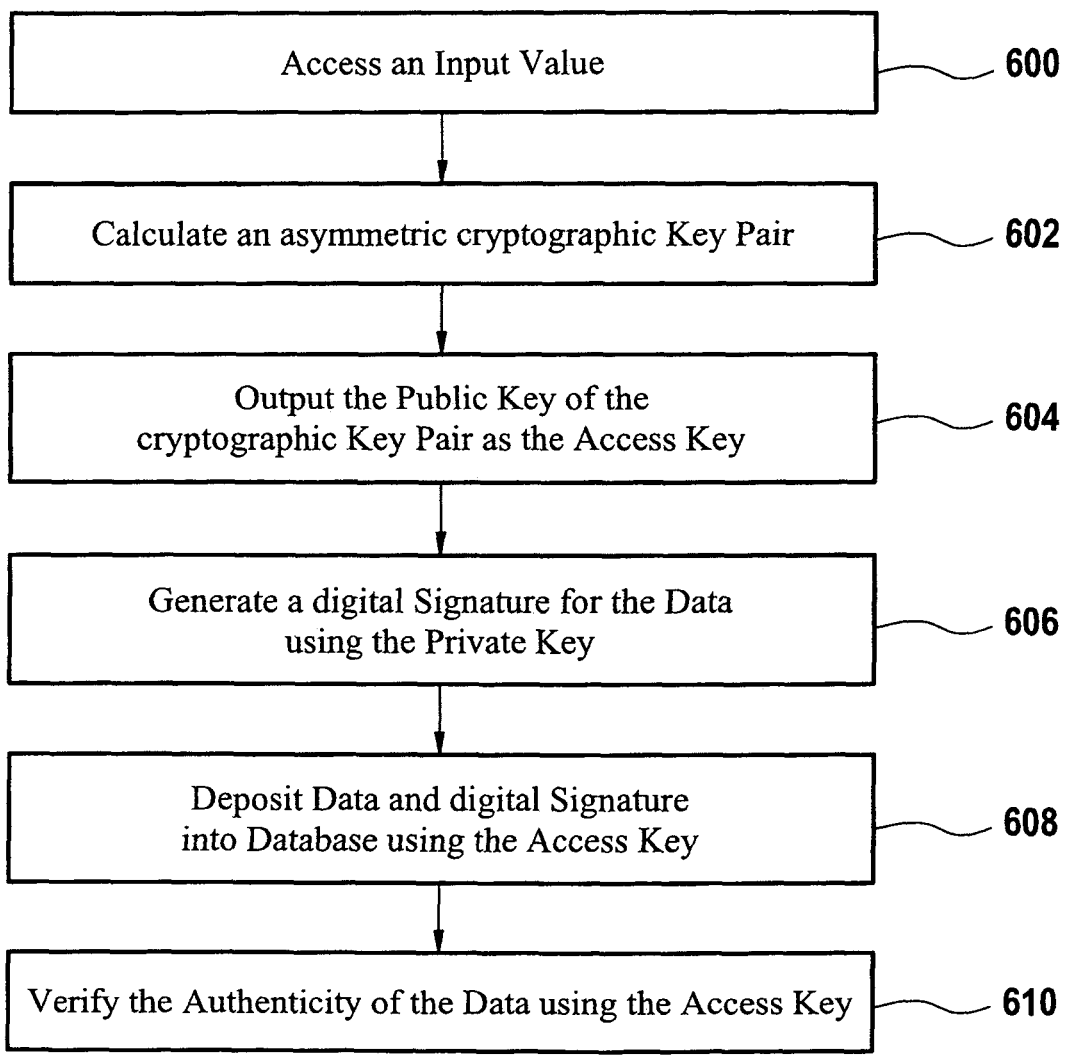
Figure 7:
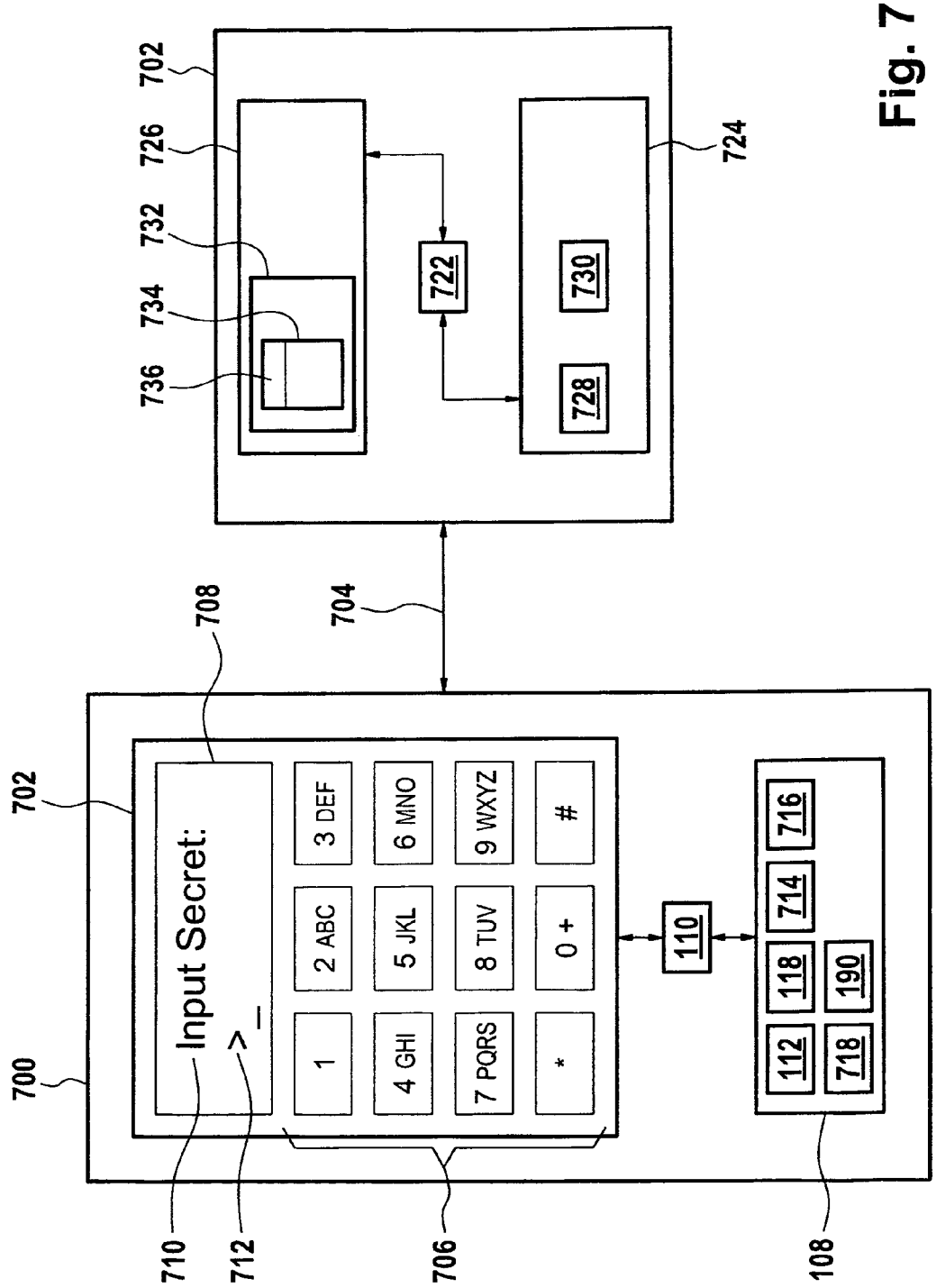
Figure 8:
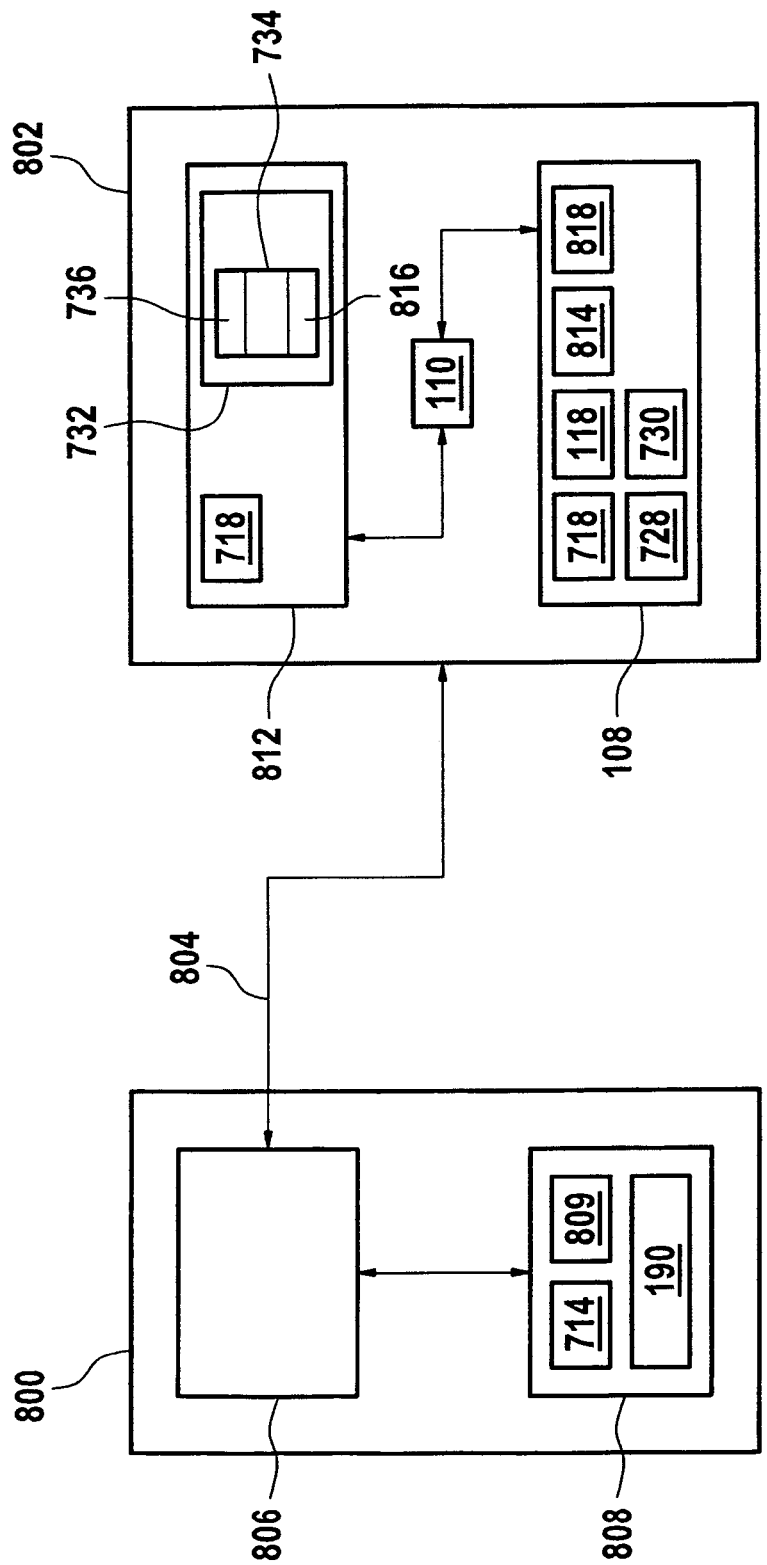
Figure 9:
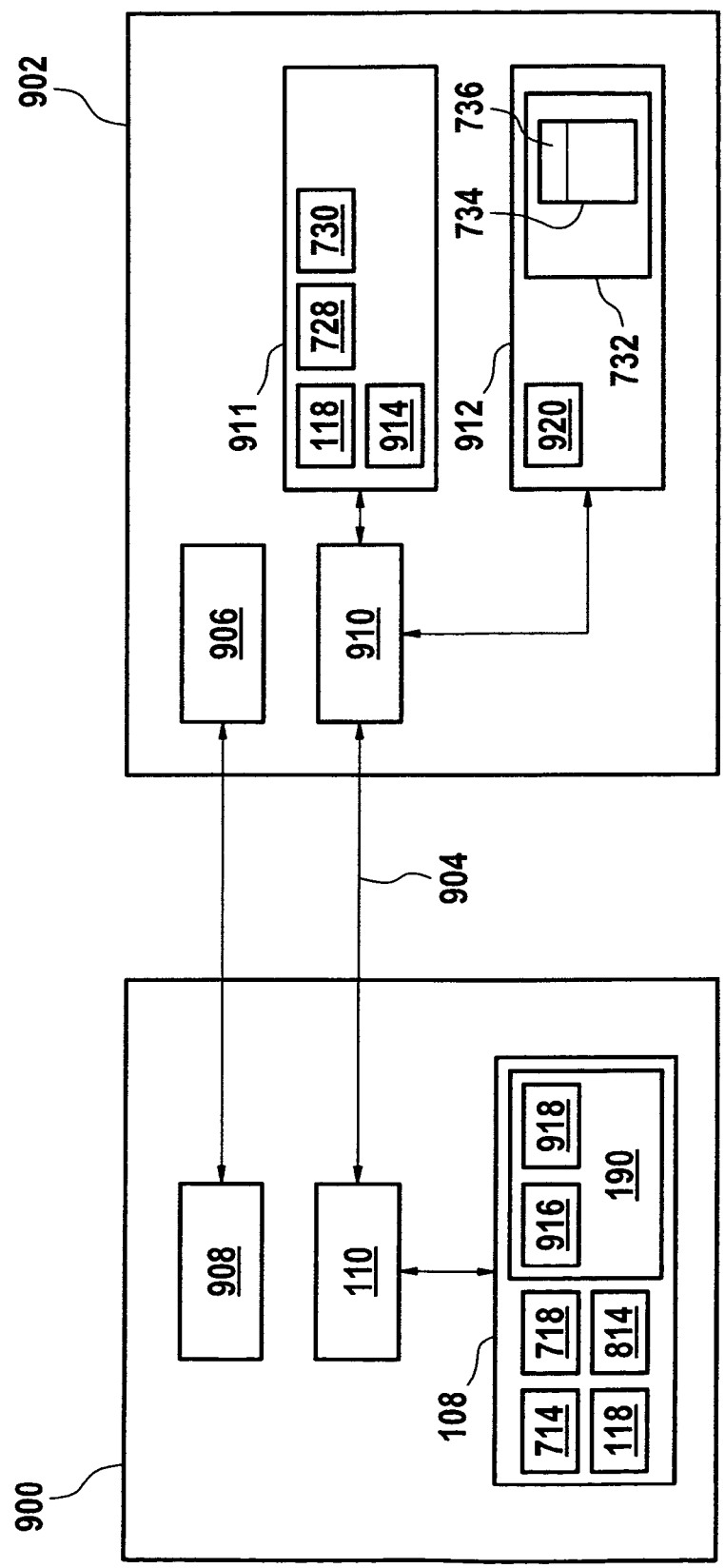

In the following embodiments of the invention are explained in greater detail, by way of example only, making reference to the drawings in which:

FIG. 1 is a block diagram of a first embodiment of a computer system of the invention, FIG. 2 is a flowchart being illustrative of an embodiment of a method of the invention, FIG. 3 is a block diagram of a further embodiment of a computer system of the invention, FIG. 4 is a flowchart being illustrative of a further embodiment of a method of the invention, FIG. 5 is a flowchart being illustrative of a further embodiment of a method of the invention, FIG. 6 is a flowchart being illustrative of a further embodiment of a method of the invention, FIG. 7 is a block diagram of an embodiment of the invention of a computing device implemented as a cellular telephone, FIG. 8 is a block diagram of a further embodiment of the invention of a computing device implemented as a security token, and FIG. 9 is a block diagram of a further embodiment of the invention of a computing device implemented as a smart card.

DETAILED DESCRIPTION OF ILLUSTRATIVE EMBODIMENTS

Throughout the following detailed description like elements of the various embodiments are designated by identical reference numerals.

FIG. 1 shows a computer system 100 that has a user interface 102 for a user's entry of a user-selected secret 112 that is designated as $s_T$ in the following. For example, a keyboard 104 may be coupled to the computer system 100 for entry of $s_T$. Instead of a keyboard 104 a touch panel or another input device can be coupled to the computer system 100 for entry of $s_T$. In addition, a sensor 106 can be coupled to the computer system 100 such as for capturing biometric data from a biometric feature of the user. For example, the sensor 106 may be implemented as a fingerprint sensor in order to provide biometric fingerprint data to the computer system 100.

A public parameter, such as the user's name or email address, can also be entered into the computer system 100 via the keyboard 104 or otherwise. For example, a personal set $V_{T,i}$ containing at least one user-specific public parameter, such as the user's name or email address, is entered into the computer system 100 by the user $T_i$.

The computer system 100 has a memory 108, such as a random access memory, and at least one processor 110. The memory 108 serves for temporary storage of the user-selected secret $s_T$ 112, a combination 114 of $s_T$ 112 and $V_{T,i}$, a private key 116, a public key 118 that constitutes an access key for a database and/or pseudonym of the user $T_i$, and a data object 120, such as a medical data object containing medical data related to the user $T_i$. Further, the memory 108 serves for loading computer program instructions 122 for execution by the processor 110.

The computer program instructions 122 provide an embedding and randomizing function 126, a key generator 128 and may also provide a database access function 130 when executed by the processor 110.

The embedding and randomizing function 126 may be provided as a single program module or it may be implemented by a separate embedding function 132 and a separate randomizing function 134. For example, the embedding function 132 or an embedding component of the embedding and randomization function 126 provides the combination 114 by concatenating $s_T$ and the user's name or by performing a bitwise XOR operation on $s_T$ and the user's name.

In one implementation, the embedding and randomizing function 126 implements symmetric encryption provided by a symmetric cryptographic algorithm, e.g. AES, using a user-specific symmetric key for encryption of the user-selected secret 112. This provides randomizing of $s_T$ 112, while embedding can be skipped.

In another implementation, the embedding function 132 is implemented by a binary cantor pairing function for embedding $s_T$ 112 and $V_{T,i}$, and the randomizing function 134 is implemented by AES encryption using a symmetric key that is the same for the entire set of users T.

In still another embodiment the embedding and randomizing function 126 is implemented by an embedding function, two different hash functions and a random number generator (cf. the embodiment of FIGS. 3 and 4).

The key generator 128 serves to compute public key 118 using elliptic curve cryptography (ECC). The base point given by the domain parameters of the elliptic curve is multiplied by the private key 116 which provides the public key 118. By varying the base point and leaving the other domain parameters of the elliptic curve unchanged multiple identifiers comprising respective public keys can be computed for the user $T_i$ on the basis of the same secret $s_T$. Thus, this results in a set of public keys.

The computer system 100 may have a network interface 136 for coupling the computer system 100 to a database 138 via a communication network 140, such as the Internet. The database access function 130 enables to perform a write and a read access for accessing the data object 120 stored in the database 138 using the public key 118, i.e. the user's pseudonym, as a database access key, e.g. a primary key, candidate or foreign key value that uniquely identifies tuples in a database relation.

As mentioned above, it is preferred not to store all data objects 120 in the database 138 using only one identifier, since data correlation analysis performed on said data objects 120 may yield information which may enable to identify the user, i.e. owner of said data objects. Instead, the data objects are stored in the database 138 in a distributed manner with different data objects 120 being accessible with different public keys 118, wherein the private key 116 and each public key of the set of public keys form an asymmetric cryptographic key pair.

Further, an analytic system 144, such as a decision support system (DSS) can be coupled to the database 138 such as via the network 140. The analytic system 144 comprises a component 146 for analyzing the data objects of the users T which are stored in the database 138, such as by data mining or data clustering.

In one application the data objects stored in the database 138 contain medical data of the various users. By analyzing the various data objects using techniques such as data mining and/or data clustering techniques medical knowledge can be obtained. For example, data clustering may reveal that certain user attributes contained in the medical data increase the risk for certain diseases.

For generating a pseudonym $p_{T,i}$ for a user $T_i$ based on the secret $s_T$ 112 and domain parameters $D_i$ containing a base point for the elliptic curve cryptography the following steps are executed by the computer system 100 in operation:

The user $T_i$ enters his or her user-selected secret $s_T$ 112 such as via the keyboard 104. In addition, the user may enter at least one public parameter $V_{T,i}$ such as his name or email address via the keyboard 104 or otherwise. Such a public parameter $V_{T,i}$ may also be permanently stored in the computer system 100.

The secret $s_T$ 112 is temporarily stored in the memory 108. Upon entry of the secret $s_T$ 112 the embedding function 132 or the embedding component of the embedding and randomizing function 126 generates the combination 114 of the secret $s_T$ 112 and the public parameter $V_{T,i}$. The resultant combination 114 is temporarily stored in the memory 108.

Next, the randomizing function 134 or the randomizing component of the embedding and randomizing function 126 is invoked in order to calculate the private key 116 on the basis of the combination 114. The resultant private key 116 is temporarily stored in memory 108. In the next step, the key generator 128 is started for computing the public key 118 by multiplying the base point contained in the domain parameters $D_i$ of the elliptic curve being used by the private key 116.

The public key 118 which is the identifier, i.e. in the present embodiment the pseudonym $p_{T,i}$, is stored in memory 108. The secret $s_T$ 112, the combination 114 as well as the private key 116 as well as any intermediate result obtained by execution of the embedding and randomizing function 126 and the key generator 128 are then erased from the memory 108 and/or the processor 110. As a consequence, there is no technical means to reconstruct the assignment of the resultant pseudonym to the user $T_i$ as only the user knows the secret $s_T$ 112 that has led to the generation of his or her pseudonym $p_{T,i}$. A data object 120 containing sensitive data of the user $T_i$, such as medical data, can then be stored by execution of the database access function 130 in the pseudonymous database 138 using the pseudonym $p_{T,i}$ 118 as a database access key, e.g. a primary key or candidate key value that uniquely identifies tuples in a database relation.

The user-selected secret $s_T$ 112 may be obtained by combining a user-selected password or secret key with biometric data of the user $T_i$ that is captured by the sensor 106. For example, a hash value of the user-selected password or secret key is calculated by execution of respective program instructions by the processor 110. In this instance the hash value provides the user-selected secret $s_T$ 112 on which the following calculations are based.

A plurality of users from the public set of enrolled participants T may use the computer system 100 to generate respective pseudonyms $p_{T,i}$ and to store data objects containing sensitive data, such as medical information in the database 138 as it has been described above in detail for one of the users $T_i$ by way of example.

For reading the data object of one of the users $T_i$ from the database 138 the user has to enter the secret $s_T$ 112. Alternatively, the user has to enter the user-selected password or secret key via the keyboard 104 and an acquisition of the biometric data is performed using the sensor for computation of a hash value that constitutes $s_T$ 112. As a further alternative, the secret key is read by the computer system from an integrated circuit chip card of the user. On the basis of $s_T$ 112 the pseudonym can be computed by the computer system 100.

The pseudonym is then used for performing a database read access on the database 138 in order to read one or more data objects 120 that are stored in the database 138 for that user $T_i$. After the database access operation has been performed the secret $s_T$ 112, the combination 114, the private key 116 and the public key 118 are erased from the computer system 100 as well as any intermediate computational results.

The above mentioned steps may be repeated several times for the generation of the set of identifiers from a single secret $s_T$ 112 or a single private key 116, wherein preferably only the base point is varied.

FIG. 2 shows a corresponding flowchart.

In step 200 the user $T_i$ enters his or her user-selected secret $s_T$ and public parameter $V_{T,i}$. In step 202 $s_T$ and $V_{T,i}$ are combined to provide the first combination 114 by the embedding function (cf. embedding function 132 of FIG. 1). Next, the randomizing function (cf. randomizing function 134 of FIG. 1) is applied on $s_T$ and $V_{T,i}$ in step 204 which provides a private key. As an alternative, an embedding and randomizing function 126 is applied on $s_T$ and $V_{T,i}$ which provides the private key.

In step 206 a public key is computed using the private key obtained in step 204 and the public key is used in step 208 as a pseudonym of the user $T_i$. For example the pseudonym may be used as a database access key, e.g. a primary key or candidate key value that uniquely identifies tuples in a database relation for storing a data object for the user $T_i$ in a database with pseudonymous data (cf. database 138 of FIG. 1).

When carrying out step 208, the public key is calculated from the private key using elliptic curve cryptography, wherein said calculation is performed with a preceding variation of the domain parameters used for performing the elliptic curve cryptography. For example, a base point variation may be performed for this purpose.

Even though, the above description always speaks about using the public key as pseudonym and using the pseudonym as a database access key, the invention is not limited to this embodiment. For example, the public keys generated using the steps above may only be a part of respective database access keys or pseudonyms, i.e. they may be comprised in the access keys or the pseudonyms. An example may be that the public key is given by 'FF06763D11A64', wherein the identifier used for accessing data in a database named 'xyz' may be given by 'xyz-FF06763D11A64'.

FIG. 3 shows a further embodiment of computer system 100. In the embodiment considered here the embedding and randomizing function 126 comprises an embedding function 132, a random number generator 148, a first hash function 150 and a second hash function 152. In the embodiment considered here the computation of the private key 116 based on $s_T$ 112 may be performed as follows:

The first hash function 150 is applied on the user-selected secret $s_T$ 112. This provides a first hash value. Next, a random number is provided by the random number generator 148. The random number and the first hash value are combined by the embedding function 132 to provide the combination, i.e. the embedded secret $s_T$ 112.

The combination of the first hash value and the random number can be obtained by concatenating the first hash value and the random number or by performing a bitwise XOR operation on the first hash value and the random number by the embedding function 132. The result is a combination on which the second hash function 152 is applied to provide a second hash value. The second hash value is the private key 116 on which the calculation of the public key 118 is based.

Dependent on the implementation it may be necessary to determine whether the second hash value fulfils one or more predefined conditions. Only if such conditions are fulfilled by the second hash value it is possible to use the second hash value as the private key 116 for the following computations. If the second hash value does not fulfill one or more of the predefined conditions a new random number is provided by the random number generator 148 on the basis of which a new second hash value is computed which is again checked against the one or more predefined conditions (cf. the embodiment of FIG. 4).

The random number on the basis of which the private key 116 and thereafter the public key 118 has been computed is stored in a database 154 that is coupled to the computer system 100 via the network 140. The random number may be stored in the database 154 using the public parameter $V_{T,i}$ as the database access key for retrieving the random number for reconstructing the pseudonym at a later point of time.

By means of the system 100, a set of identifiers comprising different public keys 118 is generated using the single secret 112 or directly the single private key 116, wherein for example in case of elliptic curve cryptography only a base point of a set of domain parameters is varied for this purpose. Individual base points 190 used for generation of the individual public keys 118 may also be stored in the memory 108 of the computing system 100. Alternatively, the base points may be stored in the database 154 or any other database external to the system 100.

Generated identifiers may be used for accessing the database 138 using the module 130, which was described with respect to FIG. 1.

In a further embodiment the identifiers may be used by the system 156 as TANs. In this case, the system 156 may be an online banking system. For example the system 156 comprises a database 158 which comprises a list in which the users' identifiers are stored as TANs, associated with an expiration value. This value may simply be a Boolean value expiration 'true/false'.

For the purpose of online banking, the user $T_i$ may perform an online banking transaction using his computer system 100. First, the user may securely log into the banking system 156 using any known secure login method. Then, the user may perform an online banking transaction. Before finally carrying out the transaction, the system 156 may prompt the user to enter a certain valid TAN. As mentioned, in the present example the set of TANs is identical to the set of identifiers, i.e. the users' public keys 118. In an embodiment, the identifiers in the database 158 may be associated with consecutive numbers, wherein similarly corresponding base points 190 may also be associated with said respective numbers in the RAM 108.

Thus, prompting the user for a valid TAN includes a number '1234', which is then used by the system 100 to retrieve a corresponding base point 190 associated with that number. For provision of a valid public key 118, the system then generates the demanded public key 118 using the secret $s_T$ 112 and the retrieved base point 190.

Then the generated public key 118 is transmitted to the system 156, checked for its validity using the database 158 and marked as expiration 'true'—the reason is that a TAN (public key) shall be used only once in this embodiment for security purposes. Finally, the desired online transaction is carried out by the system 156.

In detail, for reconstructing the individual TAN, i.e. the individual identifier, the user has to enter his or her user-selected secret $s_T$ 112 into the computer system 100 on the basis of which the first hash value is generated by the hash function 150 and the combination 114 is generated by the embedding function 132 or the embedding component of the embedding and randomizing function 126 using the first hash value and the random number retrieved from the database 154 by the use of the public parameter $V_{T,i}$.

Depending on the implementation, the user may also need to enter the user's public parameter $V_{T,i}$. A database access is performed using the user's public parameter $V_{T,i}$ as a database access key, e.g. a primary key or candidate key value that uniquely identifies tuples in a database relation, in order to retrieve the random number stored in the database 154.

In other words, the reconstruction of the private key 116 is performed by applying the embedding function 132 on the first hash value obtained from the user-selected secret $s_T$ 112 and the retrieved random number which yields the combination 114. The first hash value is combined with the random number retrieved from the database 154 by the embedding function 132 to provide the combination onto which the second hash function 152 is applied which returns the private key 116, out of which the public key 118, i.e. the identifier, can be computed. After the user $T_i$ has recovered his or her identifier a database access for reading and/or writing from or to the database 138 may be performed or the user may log into the online banking system 156 for performing online banking transactions using his identifier as a TAN.

FIG. 4 shows a respective flowchart for generating a pseudonym $p_{T,i}$ for user $T_i$. In step 300 the user enters the user-selected secret $s_T$. In step 304 a first hash function is applied on the user-selected secret $s_T$ which provides a first hash value. In step 306 a random number is generated and in step 308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 310 a second hash function is applied on the combination which provides a second hash value. The second hash value is a candidate for the private key. Depending on the implementation the second hash value may only be usable as a private key if it fulfils one or more predefined conditions. For example, if ECC is used, it is checked whether the second hash value is within the interval between 2 and n−1, where n is the order of the elliptic curve.

Fulfillment of such predefined conditions is checked in step 312. If the condition is not fulfilled, the control returns to step 306. If the condition is fulfilled, then the second hash value qualifies to be used as a private key in step 314 to compute a respective public key providing an asymmetric cryptographic key-pair consisting of the private key and the public key. In step 316 the public key computed in step 314 is used as an identifier such as for accessing a pseudonymous database or other purposes.

In case elliptic curve cryptography is used in step 314 for generating the public key, in step 318*a* single domain parameter is varied, preferable a base point, wherein all other base points are left unmodified. However, also more than one domain parameter may be modified in step 318. Afterwards, using the modified domain parameter (s), steps 314 and 316 are repeated which results in a further public key which can be used as an identifier.

The method with steps 318, 314 and 316 may be repeated as often as necessary in order to generate a desired set of identifiers.

FIG. 5 shows a block diagram which illustrates an embodiment of the method according to the invention. In step 500 an input value is accessed. The input value may be stored in a computer memory or computer storage device or the input value may be generated. For example, the input value could be generated from a user-selected secret. In step 502 an asymmetric cryptographic key pair is calculated. The input value could be used to generate both the public and private key, or the input value could also possibly be the private key. In step 504 the public key of the cryptographic key pair is outputted as the identifier.

In step 506, a domain parameter or a set of domain parameters are varied in accordance to a predefined scheme. Then, steps 502 to 504 are repeated using the same input value which results in a further identifier. Again, this is followed by step 506 and the cyclic performance of steps 502 to 504.

FIG. 6 shows a further embodiment of the method according to the invention as a block diagram. In step 600 an input value is accessed. In step 602 an asymmetric cryptographic key pair is calculated. In step 604 the public key of the cryptographic key pair is outputted as the identifier. In step 606 a digital signature for data which is to be deposited into a database is generated using the private key of the cryptographic key pair. In step 608 data is deposited along with the digital signature and possibly the information which of the (variations of the) domain parameter sets has been used to create the digital signature into a database using the identifier. The identifier may be used to grant access to the database or as a permission to write data into the database or it may also serve as a database access key for the data being deposited into the database. In step 610 the authenticity of the data is verified using the identifier, even though this step may alternatively performed at a later point in time. The identifier is the complementary public key to the private key considering the (variation of the) domain parameter set used to create the digital signature. The private key was used to generate the digital signature for the data and the public key can be used to verify the digital signature.

Again, steps 602 to 608 and optionally step 610 may be repeated for generation of different identifiers using a single private key, i.e. a single input value. Different datasets may be signed using the single private key, wherein the different datasets and digital signatures are then deposited into the database possibly along with the information which of the (variations of the) domain parameter sets has been used to create the digital signature using the respective identifiers. I.e., the datasets are deposited in a distributed manner in the database.

FIG. 7 shows a functional diagram of a cell phone 700 according to an embodiment of the invention. The cell phone 700 is shown as being connected to a computer 702 via a communication link 704. The cell phone 700 may transfer an identifier 118 to the computer 702 via the communication link 704. In this embodiment the cell phone 700 could also be other types of mobile computing devices. These include for example, but are not limited to: a personal digital assistant, an mp3 player, or a laptop. The communications link 704 may be a variety of different types of communication link. It may be a wireless cell phone connection, it may be a Bluetooth connection, or it may be a wireless land connection, or it may be a LAN connection.

The cell phone 700 is shown as comprising a processor 110. The processor 110 is connected to a user interface 102 and a memory 108. The user interface 102 in this embodiment is shown as comprising a set of input keys 706 and a display 708. However, it is understood that the input 706 and the display 708 may be combined into a single functional unit. For instance many cellular telephones, personal digital assistants, and mp3 players use touch sensitive screens. Instead of using input keys 706 gestures or symbols on a touch sensitive screen may also be used. The display 708 shows a message 710 prompting a user to input a user-selected secret 112. The display 708 also shows a cursor 712 which shows a user where the value is input. The processor 110 is also connected to a memory 108. Within the memory is shown the stored user-selected secret 112. The user-selected secret 112 may be used to generate the input value 714. In some embodiments the user-selected secret 112 may be identical with the input value 714. In other embodiments the user-selected secret 112 may be used to generate the input value 714. An input value generator 716 may be used to generate an input value 714 from a user-selected secret 112. The input value 714 may be equivalent to the private key 716 as was discussed in the embodiments of FIGS. 1 and 3. The memory 108 may also contain a cryptographic module 718 which uses the input value 714 to generate an identifier 118.

The memory 108 shown in FIGS. 1 and 3 may be equivalent to the memory 108 shown in FIG. 7. The data shown within the RAM or memory 108 shown in FIGS. 1 and 3 may also be stored within the RAM or memory 108 of FIG. 7. The processor 110 shown in FIG. 7 may also be equivalent to the processors shown in FIGS. 1 and 3. That is to say that the processor 110 and the memory 108 of FIG. 7 may also be used to implement the embodiments shown in FIGS. 1 and 3. The memory 108 shown in FIGS. 1, 3, and 7 are embodiments of a computer readable storage medium.

In FIG. 7 there is a connection 704 between the cell phone 700 and the computer 702. The cryptographic module 718 is able to generate an identifier 118 using the input value 714. The cell phone 700 is able to transmit the identifier 118 to the computer 702 via the communications link 704. The computer system 702 comprises a processor 722, computer memory 724, and computer storage 726. The computer memory 724 contains a database application program 728 and data 730. A database application program is any program or set of computer executable instructions which uses, accesses, and/or modifies a database.

The database application program 728 may use the identifier 118 from the cell phone 700 to place data 730 into a database 732 which is contained within the computer storage 726. Shown within the database 732 is the data 734 which corresponds to the data 730 mentioned before after it has been placed into the database 732. In this case the identifier 736 is stored with the data 734. The identifier could either be appended to the data 734 or it could be referenced to the data 734. During use the cell phone 700 could be used to generate an identifier 118 when a user wishes to store and/or modify data 730, 734 into the database 732. For instance a user could use his or her cell phone to produce an identifier 118 which is used for permission to post data to a bulletin board system or a social networking site. In another instance the cell phone 700 could be used to provide verification for a financial transaction. The data 730 may represent a request for a financial transaction.

According to the invention, a set of identifiers has to be generated by the processor 110 of the cell phone 700. For this purpose, the memory 108 of the cell phone 700 further comprises a set of base points 190, wherein from the single user selected secret 112 and the set of base points the set of identifiers is generated. It has to be noted, that the set of base points 190 may alternatively be retrieved from an external public source.

FIG. 8 shows an embodiment of a computing device comprising a security token 800 and a computer 802. The security token 800 is connected to the computer 802 via a communications link 804. The communications link varies depending upon the implementation of the security token 800. For instance the security token may be an RFID tag in which case the communications link 804 is a radio frequency communications link. Alternatively, the security token 800 may also be something as simple as a USB thumb drive. In this case the communications link 804 is a USB bus. The security token 800 is shown as comprising a microcontroller 806 and a memory 808. Memory 808 is shown as containing the input value 714, a set of base points 190 and an access control module 809. The access control module 809 is optional, but the access control module 809 contains instructions for operation of the microcontroller 806 which control access to the input value 714.

The security token 800 may be constructed such that the input value 714 and/or the set of base points 190 is stored in secure memory or memory which may be destroyed if the security token 800 is disassembled. The computer 802 comprises a processor 110 and computer memory 108. The computer 802 also comprises computer storage 812. During operation the processor 110 may access via the communications link 804 the input value 714 and the set of base points 190 stored in memory 808. The processor 110 may then use a cryptographic module 718 to generate identifiers 118 from the input value 714 and the set of base points 190. Alternatively, the base points 190 may be stored in the computer 802.

The cryptographic module 718 is also shown as being stored in the computer storage 812. Both the computer memory 108 and the computer storage 812 are examples of computer readable storage medium. The embodiments of FIGS. 1 and 3 may be implemented using the security token 800 and computer 802 of FIG. 8. For instance the processors 110 of FIGS. 1 and 3 may correspond to the processor 110 of FIG. 8. The memory 108 of FIGS. 1 and 3 may also correspond to the memory 108 of FIG. 8. The data and instructions shown as being stored in the memory 108 or the processor 110 may also be stored in the processor 110 or memory 108 of FIG. 8 respectively.

In the computer 802 of FIG. 8 the cryptographic module 718 is adapted for using the input value 714 for generating an identifier 118. The identifier is shown as being located within the computer memory 108. The cryptographic module 718 can use the input value 714 to generate a private key 818. The private key 818 can be used to calculate a digital signature 814. The identifier 118 can be used by a database application program 728 to enter the data 730 into database 732 which is located within the computer storage 812. Within the database 732 the data 730 is represented by the numeral 734 and the digital signature 814 by the numeral 816. The data 734 has had the identifier 736 and the digital signature 816 either appended to or referenced to the data 734. In this embodiment the data 734 contains a digital signature 816 which could be used to verify the authenticity and/or authorship of the data using the identifier 736 (which functions also as a public key). In this embodiment the security token 800 can be used for depositing data into a database 732 or other file in a way which merely identifies the origin and authenticity of the data 734 without revealing the author's identity.

Again, a multitude of different identifiers 118 may be generated using the single private key 818 for storing the data 730 into the database 732 in a distributed manner. Thus, a single private key 818 or a single input value 714 is used for generating a multitude of identifiers, employing the different base points 190.

FIG. 9 shows an embodiment of a smart card 900 according to an embodiment of the invention. The smart card 900 is shown as being connected to a computer 902 via a communications link 904. The nature of the communications link 904 depends upon how the smart card 900 is implemented. For instance if the smart card 900 connects to the computer 902 via contacts or electrical connections, then the communications link 904 is simply a computer bus. However, if the smart card 900 uses an RFID communications link then the communications link 904 to the computer 902 is via radio.

The smart card 900 in this embodiment is shown as being powered by the computer 902. The computer 902 comprises an electrical power source 906 which is connected to an electrical power receiver 908. In the case of electrical contacts then this is simply an electrical connection between the two of them. For an RFID smart card the connection between the electrical power source 906 and the electrical power receiver 908 is through electrical induction. The electrical power receiver 908 powers the smart card 900. The smart card 900 is shown as comprising a processor 110. The processor 110 is connected to a computer memory 108. The computer memory 108 contains the input value 714 in a secure memory location and a set of base points 190 for elliptical curve cryptography. The set of base points 190 comprises a first base point 916 and a second base point 918. Again, preferably the base points are available publicly and thus stored in an external database.

A cryptographic module 718 may be used to generate the public key 118 as identifier. The identifier may be a pseudonym. The processor 110 is connected to a processor 910 of the computer system 902. The computer system 902 is shown as comprising computer memory 911 and computer storage 912.

During operation the processor 910 may request an identifier 118 from the processor 110 of the smart card 900. The computer system 902 may comprise a smart card access module 920 which comprises instructions or commands which allow basic access to the smart card 900. When access is granted the processor 110 will use the input value 714, one of the base points 190 and the cryptographic module 718 to calculate the identifier 118. In this embodiment, the pseudonym is generated using elliptical curve cryptography, wherein the pseudonym is generated using the first base point 916 of the set of base points 190.

The processor 910 may also request a further identifier 914 to be generated by the smart card 900. In this case the processor 110 uses the second base point 918 which is stored with the memory 108 and the cryptographic module 718 to generate the public key 914 which is output to the processor 910. In this example the identifiers 118 and 914 are both shown as being stored in computer memory 911.

The smartcard 900 uses the input value 714 with the cryptographic module 718 to generate both identifiers 118 and 914. The identifiers 118 and 914 can be communicated with the computer 902 via the communications link 904. The database application program 728 is able to use the identifiers 118 and 914 to access a database 732 within the computer storage 912. In this figure it is shown that the data 730 has been stored in the database 732 and is referenced as data 734. In this embodiment the data 734 is referenced by the identifier 736 generated in the same manner as described above with respect to the identifiers 118 and 914, however with a third base point.

The embodiments of FIGS. 1 and 3 may be implemented using the smart card 900 of FIG. 9. For instance the processors 110 of FIGS. 1 and 3 may correspond to the processor 110 of FIG. 9. The memory 108 of FIGS. 1 and 3 may also correspond to the memory 108 of FIG. 9. The data and instructions shown as being stored in the memory 108 or the processor 110 of FIGS. 1 and/or 3 may also be stored in the processor 110 or memory 108 of FIG. 8.

Mathematical Appendix

1. Embedding Functions.

There exist n-ary scalar functions $$d: \mathbb{N}_X \ldots x \mapsto \to \mapsto$$

which are infective—and even bijective, where $\mathbb{N}$ is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function

The binary cantor pairing function π is an embodiment of embedding function 132. The binary cantor pairing function is defined as follows:

$$\pi: N \times N \to N$$

$$\pi(m, n) = \frac{1}{2}(m+n)(m+n+1) + n$$

which assigns to each fraction m/n the unique natural number π (m, n)—thus demonstrating that there are no more fractions than integers. Hence, if we map both $s_T$ and $V_{T,i}$ to natural numbers and use the fact that all identities are distinct then $\pi(s_T, V_{T,i})$ yields a unique value for each identity, even if there are equal personal secrets. To be more precise, since this function does not distinguish between e.g. ½, ²⁄₄, it assigns to each fraction an infinite number of unique natural numbers.

3. Elliptic Curve Cryptography (ECC)

Let:

p be a prime number, p>3, and $\mathbb{F}_p$ the corresponding finite field a and b integers Then the set E of points (x, y) such that $$E=\{(x,y) \in \mathbb{F}_p \times \mathbb{F}_p | y^2 = x^3 + ax + b\} \tag{F1}$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.)

The number m of points on E is its order.

Let P,Q ∈ E be two points on E. Then the addition of points $$P+Q=R \text{ and } R \in E \tag{F2}$$

can be defined in such a way that E forms an Abelian group, viz, it satisfies the rules of ordinary addition of integers. By writing $$P+P=[2]P$$

We define the k-times addition of P as [k]P, the point multiplication.

Now EC-DLP, the elliptic curve discretionary logarithm problem, states that if $$Q=[k]P \tag{F3}$$

then with suitably chosen a, b, p and P, which are known to the public, and the as well known to the public point Q it is computationally infeasible to determine the integer k.

The order n of a point P is the order of the subgroup generated by P, i.e. the number of elements in the set $$\{P, [2]P, \ldots, [n]P\} \tag{F4}$$

With all this in mind we define an elliptic curve cryptographic (ECC) system as follows. Let:

E be an elliptic curve of order m

B ∈ E a point of E of order n, the base point

Then $$D=\{a,b,p,B,n,co(B)\} \tag{F5}$$

with $$co(B) = \frac{m}{n}$$

defines a set of domain ECC-parameters. Let now g be an integer and $$Q=[g]B \tag{F6}$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited sources for cryptographically strong elliptic curves, we can take that m=n, i.e. co(B)=1, and hence reduce (F5) to $$D=\{a,b,p,B,n\} \tag{F7}$$

Now we can define our one-way function. Let D be a set of domain parameters concordant with (F7). Then $$f: [2, n-1] \to E$$

$$k \mapsto [k]B \tag{F8}$$

i.e. the point multiplication (F6), is an infective one-way function.

4. Implementing Key Generator Based on ECC

The key generator 128 (cf. FIGS. 1 and 3) can be implemented using ECC.

Definitions:

There are public sets of ECC-domain parameters $D_1, D_2, \ldots$ concordant with (F7)

$$D_i=\{a_i, b_i, p_i, B_i, n_i\} \tag{F9}$$

There are public functions: an embedding function d( ) a randomising function r( ) and our one-way function f( ) defined by (F8).

There is a public set of enrolled participants (users)

$$T=\{T_1, T_2, \ldots\} \tag{F10}$$

Note that a $T_i$ does not necessarily possess any personally identifying details, i.e. we assume that T resembles the list of participants in an anonymous Internet-community, in which each participant can select his name at his discretion as long as it is unique.

Each participant T ∈ T chooses at his complete discretion his personal secret $s_T$. In particular, for this secret is never revealed to anybody else—it is the participant's responsibility to ensure this—it is not subject to any mandatory conditions, such as uniqueness.

Our pseudonym derivation function is $$h(\ )=f(r(d(\ )))\quad\text{(F11)}$$

with the following properties:
Given a T ∈ T with his $s_T$, a $D_i$ and T, $D_i \in V_{T,i}$ $$r(d(s_T, V_{T,i}))=g_{T,i}\quad\text{(F12)}$$

where $g_{T,i}$ is a unique and strong, i.e. sufficiently random, private ECC-key for $D_i$.

The pseudonym $p_{T,i}$ corresponding to T, $s_T$ and $D_i$ is $$p_{T,i}=f(g_{T,i}, D_i)=[g_{T,i}]B_i=(x_{T,i}, y_{T,i})\quad\text{(F13)}$$

There is a public set of pseudonyms $$P=\{p_1, p_2, \ldots\}\quad\text{(F14)}$$

such that P comprises one or more pseudonyms for each participant in T computed according to (F11). This wording implies that here is no recorded correspondence between a participant in T and his pseudonyms in P, i.e. each $p_{T,i}$ is inserted in an anonymous way as $p_k$ into P.

Remarks:

The use of multiple domain parameters enables us to endow a single participant with a single personal secret with multiple pseudonyms. This in turn enables a participant to be a member of multiple pseudonymous groups such that data of these groups cannot—for, e.g. personal or legal reasons—be correlated. Therefore, attempts to exploit combined pseudonymous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i=\{a,b,p,B,n\}\quad\text{(F15)}$$

by swapping B for a statistically independent $B_2$, i.e. by choosing a different base point, we can set $$D_j=\{a,b,p,B_2,n\}\quad\text{(F16)}$$

For $D_i$ and $D_j$ refer to the same elliptic curve we can have only one function (F12) and introduce the crucial distinction with (F13). This vastly simplifies concrete implementations—we select a suitable curve and vary the base points only.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

100 Computer system
102 User interface
104 Keyboard
106 Sensor
108 Memory
110 Processor
112 A user-selected secret
114 Combination
116 Private Key
118 Public Key
120 Data Object
122 Computer program instructions
126 Embedding and randomizing function
128 Key Generator
130 Database access function
132 Embedding function
134 Randomizing function
136 Network interface
138 Database
140 Network
144 Analytic system
146 Data Analysis Component
148 Random number generator
150 Hash function
152 Hash function
154 Database
156 Computer system
158 Database
190 Set of base points
700 cell phone
702 computer
704 communications link
706 input keys
708 display
710 message
712 cursor
714 input value
716 input value generator
718 cryptographic module
722 processor
724 computer memory
726 computer storage
728 database application program
730 data
732 database
734 data
736 identifier
800 security token
802 computer
804 communications link
806 microcontroller
808 memory
809 access control module
812 computer storage
814 digital signature
816 digital signature
818 identifier
900 smart card
902 computer
904 communications link
906 electrical power source
908 electrical power receiver 910 processor
911 computer memory
912 computer storage
914 identifier
916 first base point
918 second base point
920 smartcard access module

What is claimed is:

1. A computer implemented method for generating a set of identifiers from a private key, the method comprising the steps of:
   generating a private key, wherein generating the private key comprises:
      receiving an input value, wherein the input value is a user-selected secret;
      storing the user-selected secret in memory;
      computing the private key by applying an embedding or randomizing function onto the user-selected secret; and
      storing the private key in memory;
   calculating a set of public keys using the private key, wherein the private key and each public key of the set of public keys form an asymmetric cryptographic key pair;
   erasing the user-selected secret and the private key from memory; and
   outputting the identifiers comprising the public keys.

2. The method of claim 1, wherein the public keys are the identifiers.

3. The method of claim 2, wherein the identifiers are database access keys.

4. The method of claim 3, further comprising verifying the authenticity of the data using the identifier.

5. The method of claim 3, further comprising depositing data into a database using the identifiers.

6. The method of claim 5, further comprising generating a digital signature for the data using the private key, wherein the digital signature is deposited into the database with the data.

7. The method of claim 5, wherein the identifiers are used as pseudonyms by the database.

8. The method of claim 1, wherein the set of public keys is calculated from the private key using elliptic curve cryptography, wherein said calculation is performed by a variation of the domain parameters used for performing the elliptic curve cryptography.

9. The method of claim 8, wherein said variation of the domain parameters is a variation of base points.

10. The method of claim 1, wherein applying the embedding and randomizing function comprises:
    applying a first one-way function on the user-selected secret to provide a first value,
    providing a random number,
    embedding the random number and the first value by combining them to provide a combination,
    applying a second one-way function on the combination to provide a second value, wherein the second value constitutes the private key.

11. A computer system for generating a set of identifiers from a private key, the system comprising:
    a processing unit being operable for:
       calculating a set of public keys, wherein the private key and each public key of the set of public keys form an asymmetric cryptographic key pair;
       generating the private key, wherein generating the private key comprises:
          receiving an input value, wherein the input value is a user-selected secret;
          storing the user-selected secret in memory;
          computing the private key by applying an embedding or randomizing function onto the user-selected secret;
          storing the private key in memory;
          computing the set of public keys using the private key; and
          erasing the user-selected secret and the private key from memory; and
    an interface for outputting the identifiers comprising the public keys.

* * * * *